United States Patent [19]

Sullivan et al.

[11] Patent Number: 4,768,840
[45] Date of Patent: Sep. 6, 1988

[54] BRAKE CONTROL SYSTEM AND METHOD

[75] Inventors: Mark W. Sullivan, Pontiac; Thomas A. Gee, Allen Park, both of Mich.

[73] Assignee: Eaton Corporation, Cleveland, Ohio

[21] Appl. No.: 43,063

[22] Filed: Apr. 27, 1987

[51] Int. Cl.<sup>4</sup> ............................................. B60T 13/00
[52] U.S. Cl. ................................. 303/6.01; 303/22.1; 303/7; 303/100; 303/112; 303/9.62; 303/24.1; 188/3 R; 188/181 T; 188/195; 188/349; 188/112 R
[58] Field of Search ................... 303/7, 6, 20, 22, 100, 303/91, 101, 102, 112, 107, 113-119, 61-63, 68-69, DIG. 1-4, 13-15, 24, 104, 40; 188/349, 195, 3 R, 3 H, 181, 112; 364/426, 424

[56] References Cited

U.S. PATENT DOCUMENTS

| 3,767,270 | 10/1973 | Urban et al. | 303/20 X |
|---|---|---|---|
| 3,768,872 | 10/1973 | Urban et al. | 303/20 X |
| 3,854,556 | 12/1974 | Gee | 188/181 R |
| 3,893,696 | 7/1975 | Urban et al. | 303/40 X |
| 3,929,382 | 12/1975 | McNinch, Jr. et al. | 303/107 X |
| 3,929,383 | 12/1975 | Urban et al. | 303/40 X |
| 3,966,267 | 6/1976 | McNinch, Jr. et al. | 303/20 X |
| 4,327,414 | 4/1982 | Klein et al. | 364/426 |
| 4,457,407 | 7/1984 | Monick et al. | 188/71.9 |
| 4,476,968 | 10/1984 | Urban et al. | 188/329 |
| 4,591,213 | 5/1986 | Rapoport | 303/93 |
| 4,606,586 | 8/1986 | Eckert et al. | 303/93 |
| 4,616,881 | 10/1986 | Müller et al. | 303/7 |

Primary Examiner—Douglas C. Butler
Attorney, Agent, or Firm—H. D. Gordon

[57] ABSTRACT

A vehicle braking control system is provided for sensing (76) the magnitude of the vehicle operator's demand for braking effort and for distributing the braking effort between the individually controllable vehicle (22) brake sites to achieve balanced braking (12) if relatively low braking effort demand (0% to A%) is sensed and to achieve proportional braking (14) if relatively high braking effort demand (B% to 100%) is sensed.

30 Claims, 7 Drawing Sheets

BRAKE CONTROL SYSTEM AND METHOD

BACKGROUND OF THE INVENTION

RELATED APPLICATIONS

This application is related to U.S. Ser. No. 043,009 and U.S. Ser. No. 043,010, both filed Apr. 27, 1987.

1. Field of the Invention

This invention relates to controls for brake systems for vehicle systems, such as single vehicle systems (i.e. trucks, buses and passenger cars) and multiple vehicle systems (i.e. tractor—trailer vehicles). In particular, this invention relates to controls for vehicle brake systems which, depending upon the level of operator demand for braking, will distribute the braking effort between the individually controllable vehicle brake sites, such as the wheels, axles, sets of axles and/or sub-vehicle brake systems to achieve balanced braking, proportional braking or a compromise thereof.

2. Description of the Prior Art

Brake systems, and the controls therefor, for vehicles, including heavy duty vehicles such as trucks, are, of course, well known in the prior art.

Brake systems for passenger cars are, in general, somewhat easier to design than brake systems for heavy duty vehicles such as trucks as the loading and maintenance of passenger vehicles will not vary to the extent loading and maintenance will vary in a truck, such as the loading on the tractor of a tractor-trailer which may comprise a tractor only, a tractor with an empty or lightly loaded trailer or a tractor with a heavily loaded trailer.

Brake systems of the anti-lock type, for all types of vehicles, are well known in the prior art. Briefly, these systems operate to obtain a maximized vehicle stability (i.e. maximized transverse coefficient of friction of braked wheels) by maintaining the longitudinal slip of the braked wheels within predetermined limits. This usually requires modulating the braking forces on an individual wheel and/or individual axle basis to maintain at least some wheel rotation.

Examples of prior art anti-lock systems may be U.S. Pat. Nos. 3,767,270; 3,768,872; 3,854,556; 3,893,696; 3,929,383; 3,929,382; 3,966,267; 4,392,202 and 4,591,213, the disclosures of all of which are hereby incorporated by reference.

Brake systems which control braking to achieve a driver demand, sense driver demand in "brake-by-wire" manner, sense coefficient of friction and modify brake forces accordingly, sense load on a wheel and modified braking effort accordingly, sense wheel slip and/or use electronic signals to achieve trailer brake response are also disclosed in the prior art as may be seen by reference to U.S. Pat. Nos. 4,140,352; 4,327,414; 4,494,199; 4,512,615; 4,545,240; 4,591,213; 4,606,586; 4,616,881; and 4,648,663, the disclosures of which are hereby incorporated by reference.

While the prior art brake systems which modify braking effort in response to sensed parameters to achieve various goals, such as vehicle stability or the like, do, in general, provide enhanced vehicle braking, they are subject to further improvement as both balanced and proportional braking, depending upon operator demand, is not provided.

SUMMARY OF THE INVENTION

In accordance with the present invention, many of the drawbacks of the prior art have been overcome or minimized by the provision of a multiple mode vehicle brake control system particularly well suited for, but not limited to, heavy duty vehicles, especially articulated multiple vehicle systems such as tractor-trailers. The system provides the advantages of improved performance as to both operating costs and safety while being of a relatively lower cost than prior art brake systems.

The above is accomplished by providing a brake control system having means to sense the magnitude of the brake effort required by the operator (usually sensed as a percentage of displacement of the vehicle brake pedal) and means to distribute the braking effort between the braked wheels, or sets of braked wheels, to achieve a balanced braking under conditions of relatively low operator braking demand and a proportioned braking under conditions of relatively high operator braking demand. Preferably, under conditions of intermediate operator braking demand, the braking effort will be transitionally distributed between the wheels in a manner to achieve a smooth transfer from the balanced to the proportional braking modes to preserve operator comfort and maintain vehicle stability.

Accordingly, it is an object of the present invention to provide an improved vehicle braking system control for distributing the braking effort between the individually controllable brake wheels, or sets of wheels, to achieve balanced braking when the operator applies a light (normal) effort to the brake pedal and to achieve proportional braking in response to higher than normal operator effort on the brake pedal.

This and other objectives and advantages of the present invention will become apparent from a reading of the detailed disclosure of the preferred embodiments taken in connection with the drawings.

DESCRIPTION OF THE PREFERRED EMBODIMENT

Figure 1:
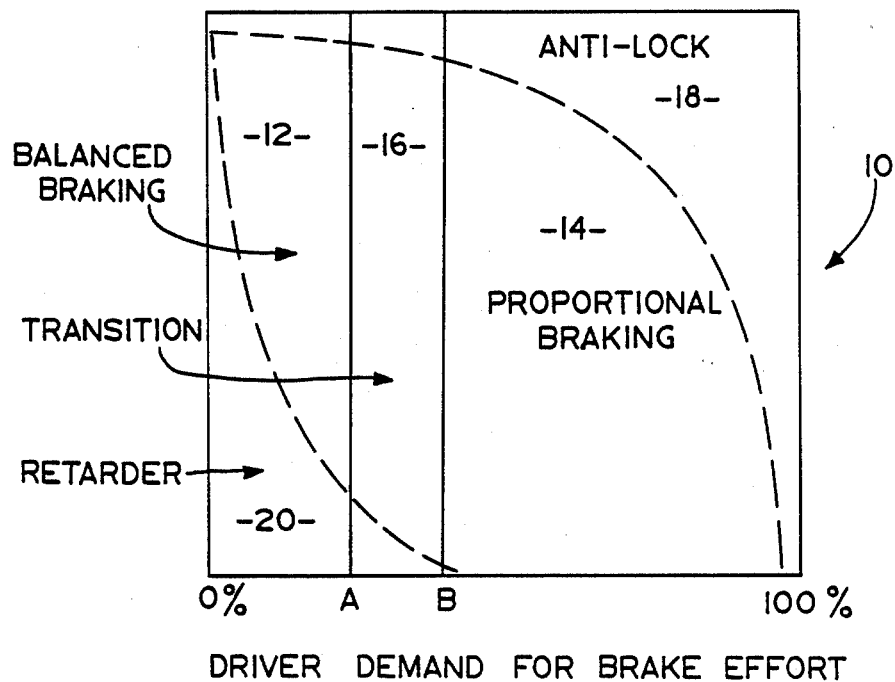
FIG. 1 is a chart illustrating the multiple modes of the vehicle braking provided by the present invention.

The various modes of operation for a vehicle brake system according to the present invention are illustrated in chart 10 of FIG. 1. Briefly, as illustrated in section 12, at relatively low demands for brake effort (sensed by force applied to and/or displacement of the vehicle brake pedal) the system will minimize wear on the brake friction surfaces by controlling the brakes to balance brake effort. As illustrated in section 14, at relatively high demands for brake effort, the system will distribute the braking effort in proportion to load to maximize vehicle braking capability and stability. At intermediate demands for braking effort, section 16, the braking effort is distributed in a manner to achieve a smooth transition from balanced to proportional distribution of the braking effort.

Preferably, the system will, as shown in section 18, have an anti-lock mode wherein, if actual or impending wheel-lock is sensed at any one or more wheels, the brakes will be applied and released (usually with a proportioned distribution of braking effort) to keep the wheels turning to utilize the higher sideways adhesion of non-locked wheels.

Additionally, if the vehicle is equipped with driveline and/or engine retarder means, the system may utilize such retarders at lower brake effort demand, s shown in section 20, as a substitute for, or supplement to, the vehicle brakes to minimize vehicle operating costs.

The vehicle brake control system of the present invention is effective to distribute the braking effort between the individually controlled braked wheels or sets of wheels of the vehicle in multiple modes as a function of the magnitude of operator demand for braking effort.

Figure 9:
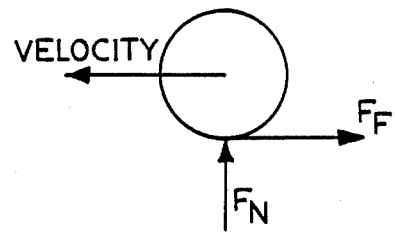
FIG. 9 is a force diagram for a braked wheel.

One of the modes, herein defined as the "proportional braking" mode, is well known in the vehicle industry and involves the "braking ratio", which is the ratio of tangential friction force to radial load (i.e. $F_F/F_N$ in FIG. 9) for the tire/road interface.

The limiting value, of course, is the coefficient of friction ("MU"). If each wheel or set of wheels develops tangential friction force (or braking force) to load in the same proportion, or ratio, then, to the extent each of the wheels have equal MU to slip relationships, the vehicle can utilize all of the available adhesion on all of its wheels at the same time. This principal and the advantageous effects of achieving equal braking ratios at each wheel is well known in the braking industry.

Specifically proportional braking, as used herein means a braking effort distribution on a vehicle where the ratio of tangential braking force to radial load force is (or very nearly is) the same for all wheels or sets of wheels, or is related in a predetermined manner. The wheels may be considered individually or taken in sets, the sets may consist of all of the wheels on one axle, all of the wheels on a tandem pair of axles (a bogey set), or all the wheels on one sub-vehicle when the vehicle is the combined total of several sub-vehicles.

Another, different, principal for the distribution of braking effort in a vehicle braking system is to create braking energy inputs related to some brake or vehicle system parameter other than the loads or tire to road adhesion factors. Some of these parameters are: balanced wear, or balanced work, or balanced temperature between brakes. Whatever the parameter chosen, the distribution of braking effort to balance it is, in general, different from the distribution of braking effort in proportional braking.

Balanced braking as used herein is a braking effort distribution on a vehicle wherein the distribution of the braking effort is not dependent upon the radial load forces usually it is one which will achieve a desired balance, such as equal wear, brake force, lining temperature or a parameter directly related to brake wear. The rate of wear of modern brakes is primarily related to the amount of work performed by the brakes (i.e. brake torque times revolutions) factored by the brake temperature, especially the surface temperature of the linings. The temperature factor in wear is especially severe. For example, wear rates of brake linings at 800° F. are as much as four times higher than the wear rates at 300° F. For similarly sized and configured brakes, having similar heat dissipation properties, the brake that does the most work will have the highest temperature and will wear at a rate that is even more exaggerated than the difference in work.

For a given amount of total brake linings in a vehicle brake system, the total lining will provide the longest wear life if all of the lining operates at the lowest possible temperature. That occurs when the heat (energy) is spread uniformly over the drum or disc surface areas. It should also be noted that operation at the lowest possible temperature also tends to provide the largest energy absorption reserve capacity. High energy at one brake will eventually cause it to fail catastrophically although fade is to some extent a self-protecting feature. Accordingly, brake temperature or some other measure of brake energy, including the braking force, can be used to distribute braking effort to balance wear in a vehicle braking system.

A variety of studies of vehicle brake usage, especially brake usage for heavy duty vehicles, indicates that most brake applications are at low demand. For example, on vehicles equipped with an air actuated brake system having capacity for 100 psi brake pressures, ninety percent (90%) of all applications are at less than 20 psi. The majority of the brake wear occurs at relatively low brake torque demand by the driver. For the majority of stops, the adhesion capacity of the tire to the road is not approached. A 20 psi brake application on a fully loaded truck axle usually requires no more than a 0.1 friction coefficient. Dry roads can provide 0.6 to 1.0 friction coefficient while wet asphalt can provide 0.3 coefficient of friction. Therefore, brake effort distributions that are based on the extremes of braking capacity, regardless of the magnitude of the operator brake effort demand, do not address some of the needs of the vehicle owner and/or operator.

Figure 2:
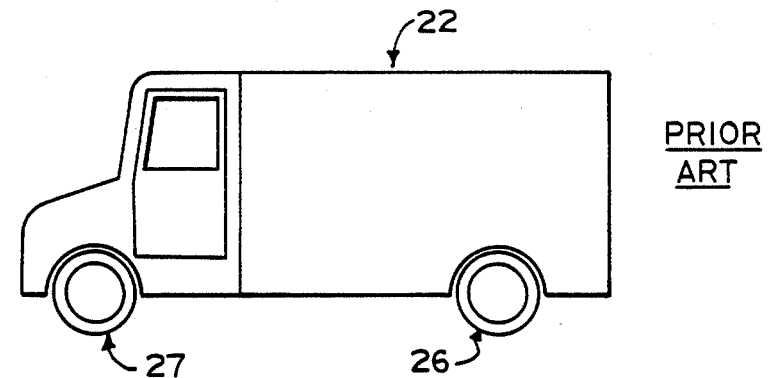
FIG. 2 is a schematic illustration of a conventional single vehicle system in which the brake control system of the present invention may be utilized.
Figure 3:
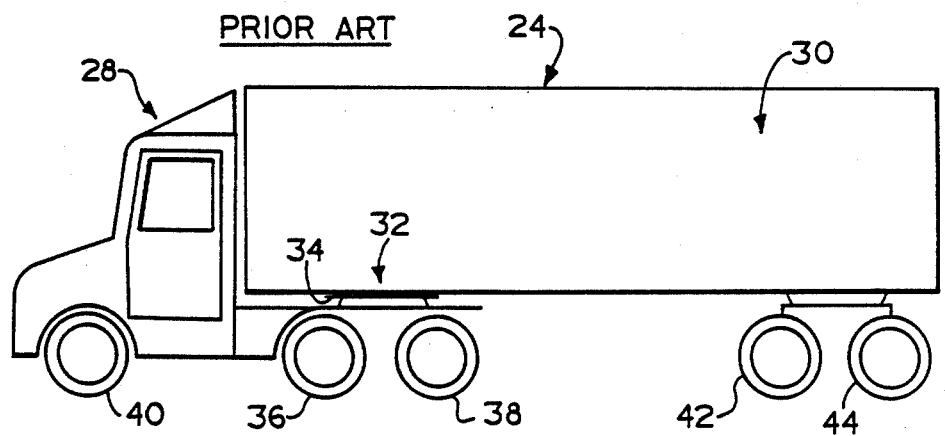
FIG. 3 is a schematic illustration of a conventional multiple vehicle system in which the brake control system of the present invention may be utilized.

The brake control system of the present invention is applicable to single vehicle systems such as the truck 22 illustrated in FIG. 2 and to multiple vehicle systems such as the tractor-trailer system 24 illustrated in FIG. 3. Briefly, as is well known in the art, truck 22 comprises a vehicle on a single frame usually having at least one rear drive axle 26 and a front steer axle 27. The tractor-trailer system 24 illustrated in FIG. 3 comprises a tractor 28 and a semi-trailer 30 attached thereto by a connecting means 32 which comprises the well known fifth wheel 34 fixed to the tractor for selective engagement with a king pin fixed to the trailer. The tractor typically comprises a pair or tandem set of rear drive axles 36, 38 and a front steer axle 40. The trailer 30 typically comprises a tandem set or pair of non-steerable non-driven trailer axles 42 and 44. Typically, but not necessarily, the front axles, 27 and 40, have non-driven steerable wheels.

The present invention, as it relates to a single vehicle system such as truck 22, involves the intra-vehicle distribution of the braking effort. The braking system of the present invention, as it relates to a multiple vehicle system such as truck tractor trailer system 24, involves at least the intra-vehicle braking effort distribution for tractor 28 and may also involve the intra-vehicle braking effort distribution for trailer 30 and the inter-vehicle braking effort distribution between tractor 28 and trailer 30.

Providing a braking system control, preferably a computer controlled braking system, that can alter braking effort distribution based upon the current state of the vehicle, the environment and the desired output is advantageous. At times, when adhesion is generally not critical, the braking effort distribution goal can be established on some other important factors, equalized wear for instance. At other times, such as when the driver demands higher levels of braking, the system goals can change, for instance to optimize sideways stability. At other times, when demand is at an intermediate level, the goals of the brake distribution effort can be to blend or transcend balanced and proportional braking without jerking to the vehicle. Since it is always possible that some of the wheels may have low tire adhesion (i.e. if on a patch of ice or the like) an anti-lock system could monitor the wheel lockup condition and intercede to reduce the average braking torque on individual or sets of brakes to retain directional control.

By utilizing an electrically controlled brake system with feedback, optimal response speed and accuracy of the system is possible. Additionally, the target output is not fixed as with conventional technology, but is variable depending upon the predetermined logic rules within the central processing unit. The multi-mode brake effort distribution system of the present invention is an improvement over existing braking systems in that the system may be controlled to provide an optimal compromise in maintenance cost reduction, brake reserve capacity maximization and vehicle stopping distance optimization over a variety of vehicle conditions with high directional stability and steerability. Importantly, these features can be provided for tractor and trailer combinations, as well as for single vehicle systems, somewhat independent of the condition of the brakes on each of the individual sub-vehicles.

Figure 5:
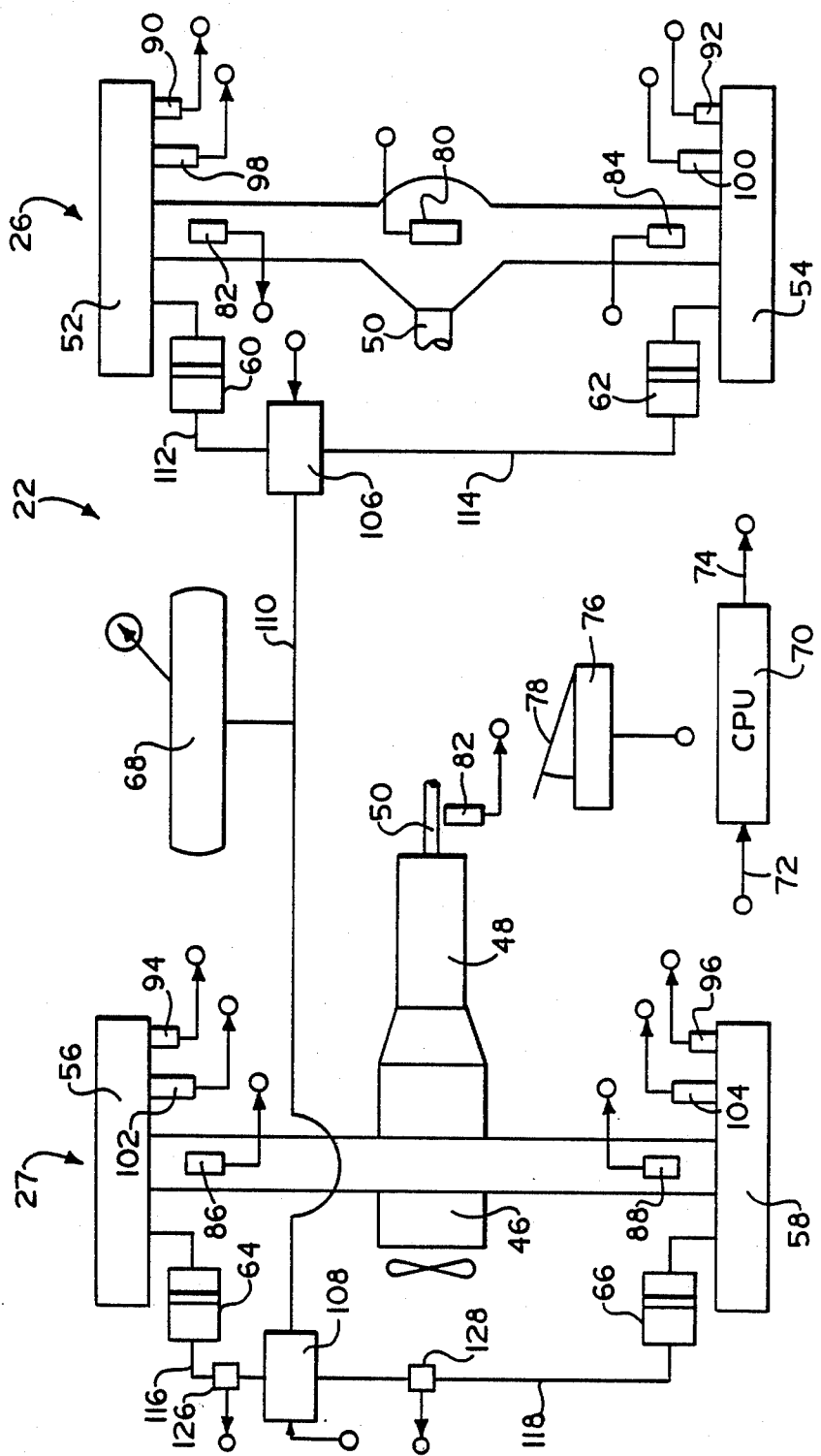
FIG. 5 is a schematic illustration of the brake system of the present invention for the single vehicle system illustrated in FIG. 2.

One embodiment of the present invention may be seen by reference to FIG. 5 which illustrates a braking system for truck 22. Truck 22 includes a rear drive axle 26 driven by engine 46 through transmission 48 and driveline 50. A pair of driven wheels 52 and 54 are associated with the rear drive axle 26 and a pair of front wheels 56 and 58 are associated with the front steer axle 27. Air actuated brakes 60 and 62 are provided for braking the rotation of wheels 52 and 54, respectively, and air actuated brakes 64 and 66 are provided for braking the rotational speed of wheels 56 and 58, respectively. Rear brakes 60 and 62 are, as is well known in the prior art, of the same size and type as likewise are front brakes 64 and 66. In the system illustrated, the brakes are air actuated brakes of one of the well known types such as the "S" cam actuated drum brake type or the air disc brake type, the details of which are well known in the prior art and may be seen in greater detail by reference to U.S. Pat. Nos. 4,476,968 and 4,457,407, the disclosures of both of which are hereby incorporated by reference. As is known, while both of the front brakes and both of the rear brakes should be of the same size and type, it is not necessary that the front brakes 64 and 66 be of the same size and/or type as the rear brakes 60 and 62. Compressed air for actuating the brakes is supplied from a plurality of supply tanks 68, only one of which is shown, from the vehicle compressor (not shown) or the like.

The braking system includes a control unit 70, which for purposes of flexibility and responsiveness is preferably an electronic microprocessor based control unit having means 72 for receiving a plurality of input signals, means for processing the input signals in accordance with predetermined logic rules, and means 74 for issuing command output signals to various system operators.

A sensor 76 senses the operator's displacement of a brake pedal 78 to provide an input signal indicative of the driver's demand for vehicle stopping effort. Sensors of this type are known in the prior art and may be seen in greater detail by reference to U.S. Pat. Nos. 4,140,352; 4,327,414 and 4,512,615. Typically, such transducers will sense the displacement of and/or force applied to the brake pedal 78 and will provide an output signal proportional thereto. An input signal indicative of the deceleration of the vehicle may be provided by means of a decelerometer 80 which is fixed to the vehicle or by means of a transmission output shaft speed sensor 82 which will provide a signal indicative of the rotational speed of the drive line which may be differentiated by the CPU 70. Force sensors 82, 84, 86 and 88 are utilized to provide input signals indicative of the braking and load forces at the wheels, 52, 54, 56 and 58, respectively. The force sensors may be strain gauge based and/or of the linearly variable displacement transducer type as is well known in the prior art. For purposes of achieving a more accurate distribution of braking effort during the brake balancing mode, temperature sensors 90, 92, 94 and 96 may be provided for sensing the temperatures of the brakes at wheels 52, 54, 56 and 58 respectively. The temperature sensors may be non-contact infrared sensors, or the like, as is known in the prior art. To allow the brake system to have an anti-lock mode, wheel speed sensors 98, 100, 102 and 104 are provided to provide input signals indicative of the rotational speed of wheels 52, 54, 56 and 58, respectively The central processing unit 70 will, as will be explained in greater detail below, process the input signals in accordance with predetermined logic rules to generate command output signals to the control valves 106 and 108. Briefly, control valve 106 is connected to the supply tank 68 through supply line 110 and will, in accordance with the command output signals from CPU 70, provide pressurized fluid via branch conduit 112 to brake 60 and branch conduit 114 to brake 62. Control valve 108 is connected to supply line 110 from one of the supply tanks and, in accordance with the command output signals, will provide pressurized air through branch conduit 116 to brake 64 and branch conduit 118 to brake 66. Control valve 108 independently pressurizes the conduits 116 and 118. Accordingly, it may be seen that the braking effort at each of the wheels may be individually controlled in a closed loop manner in response to command output signals generated by the CPU 70 in response to the input signals received and processed thereby.

The method of controlling or distributing the braking effort amongst the vehicle wheels 52, 54, 56 and 58 in the brake system for truck 22, will be described in greater detail below. While the braking system of the present invention involves distribution of the braking effort at each of the wheels, the system measures and controls the parameter of braking force at each of the wheels as an accurate indication of the braking efforts.

In a more simplified and inexpensive alternative system, somewhat less accurate than that illustrated in FIG. 5, pressure sensors, such as the pressure sensors 120, 124, 126 and 128 may partially replace the force sensors 82, 84, 86 and 88, respectively, as sensors for providing an input signal indicative of the braking force at the wheels 52, 54, 56 and 58, respectively. Briefly, it has been found, that given an air actuated brake of known parameters, such as brake size and type, air motor size and type, lining type, slack adjuster size and type, and the like, the braking force applied by that brake corresponds in a known manner to the pressure supplied to the air motor with an accuracy of approximately plus or minus 10%.

Figure 4:
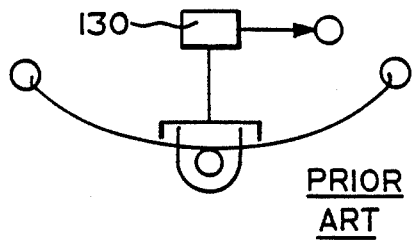
FIG. 4 is a schematic illustration of a prior art load sensor which may be utilized with the brake system of the present invention.

While the force sensors 82, 84, 86 and 88 may be of the type providing signals indicative of both tangential (i.e. braking) force and radial (i.e. load) force, separate load sensors may, in the alternative, be utilized. Load sensors are well known in the prior art as may be seen by reference to FIG. 4, which illustrates a typical prior art load sensor 130. Such load sensors may be provided for each wheel or may be provided on an axle-by-axle basis.

In the present example, brake force ($F_F$ in FIG. 9) will be the measured and the controlled parameter to distribute brake effort or brake work amongst the vehicle wheels. As indicated in FIG. 1, when the operator's demand for braking effort is relatively low (between 0% and A% of 100% demand) the brake effort will be distributed in a balanced braking mode. When the operator's demand for braking effort is relatively high (between B% and 100% demand) the brake effort will be distributed in a proportional braking mode. If operator demand is intermediate (A% to B% of 100% demand) the braking effort will be distributed in a transitional manner to provide a smooth transition from the balanced to the proportional braking modes. Typically, A will equal about 15%–25% while B will equal about 30%–35%. Preferably, the values of A and B will be varied in view of driver requirements, expected duty cycles; fleet maintenance practices and the like. The values of A and B may also be varied on a closed loop basis in view of sensed vehicle operating conditions (i.e. high incidence of wheel-lock, etc.).

While this example relates to intra-vehicle brake effort distribution between wheels 52, 54, 56 and 58 of truck 22, the same modes of operation are applicable to the intra-vehicle distribution of braking effort between the wheels of trailer 30 and to the inter-vehicle distribution of braking effort between the tractor and trailer of multiple vehicle system 24 (i.e. inter-tractor-trailer balanced and proportional braking).

During operation in the balanced braking mode, the braking force (BF) at each wheel of an N wheel braking system is:

$$BF_{XB} = C_X * g(D) \Big[ _{X=1}^{N}$$

where:
$BF_{XB}$ = the braking force at the X wheel during balanced braking.
$C_X$ = a constant based upon relative brake size, type.
$C_X$ is not a function of the load $V_X$ at the X wheel.
g = balanced braking function.
D = sensed demand.

In other words, during balanced braking, the braking force at each wheel (or set of wheels) is a function (g) of the sensed operator demand (D) times a constant (C) related to known individual brake parameters (size, type and motor size, etc.)

The CPU 70 will sense the brake force $$(BFS_X) \Big[ _{X=1}^{N}$$

at each wheel and will issue command outputs to the control valves 106 and 108 to pressurize brakes 60, 62, 64 and 66 to minimize the error ($E_{XB}$) equation:

$$E_{XB} = BF_{XB} - BFS_X \Big[ _{X=1}^{N}$$

If $E_{XB}$ is positive, increased pressure is applied to the brake, if $E_{XB}$ is negative, the pressure applied to the brake is decreased.

Generally, during balanced braking, the goal is to balance wear. If temperature is not sensed, heat dissipation is considered to be equal in similar brakes, and, as the entire vehicle is at the same velocity, then ignoring small differences in wheel slip, the product of (BF)×(vehicle velocity)×(time) equals brake input energy. To achieve equal energy input, all $C_X$ should be equal.

If temperature sensors (90, 92, 94 and 96) are utilized, a much more accurate wear balance may be achieved. In such a situation, $$BF_{XB} = C_X * g(D,T_X) \Big[ _{X=1}^{N}$$

where $T_X$ = the temperature at wheel X.

The force at brake$_X$ would be modified in accordance with the temperature sensed at brake$_X$ relative to the temperature at the other (N−1) brakes. The higher the sensed temperature at the brake, relative to the temperatures of the other brakes, the lower the $BF_{XB}$. In such a system having temperature sensors, the energy inputs might start equal, but, if temperature differences diverged due to differences in heat dissipation characteristics, the energy distribution would be redirected accordingly.

During operation in the proportional braking mode, the braking forces at each wheel of an N wheel braking system is $$BF_{XP} = K_X * f(D,L_X) \Big[ _{X=1}^{N}$$

where:
$BF_{XP}$ = the braking force at the X wheel during proportional braking;

$K_X$ = a constant based upon relative brake parameters;
f = proportional braking function;
D = sensed demand;
$L_X$ = load at X wheel.

In other words, during proportional braking, the braking force at each wheel is a function (f) of sensed demand (D) and the load (L) at the wheel. The load may be sensed by force sensors 82, 84, 86 and 88, or separate load sensors, such as sensor 130, may be provided at each of the n wheels.

As with balanced braking, during proportional braking the CPU 70 will sense the brake force at each wheel ($BFS_X$) and issue command outputs to the control valves 106 and 108 to minimize the error ($E_{PX}$) equation:

$$E_{PX} = BF_{XP} - BFS_X \quad \begin{matrix} N \\ X = 1 \end{matrix}$$

In general, in the proportional braking mode, the brake force to be applied at each wheel is proportional to operator demand multiplied by the product of the mean braking ratio times the sensed load.

For operation in the transitional mode, the braking forces at each wheel of the N wheel braking system is $$BF_{XI} = h(C_X, K_X, D, L_X) \quad \begin{matrix} N \\ X = 1 \end{matrix}$$

where
$BF_{XI}$ = the braking force at the X wheel during intermediate braking;
h = intermediate braking function.

In other words, during intermediate or transitional braking, the braking force at each wheel is an interpolation of the other modes designed to provide a smooth transition therebetween.

As with the other modes, the CPU will issue commands to the control valves to minimize the error ($E_{IX}$) equation at each wheel.

$$E_{IX} = BF_{XI} - BFS_X \quad \begin{matrix} N \\ X = 1 \end{matrix}$$

As indicated above, a relatively less expensive but somewhat less accurate brake system for truck 22 can be provided by eliminating the horizontal force sensors 82, 84, 86 and 88 associated with wheel 52, 54, 56 and 58, respectively, and replacing same with pressure sensors 120, 124, 126 and 128 and utilizing prior art type vertical load sensors 130 for each wheel. In such a system, pressure applied to each brake is the parameter which is monitored and controlled. It has been observed, that in a brake of known size and type, that the pressure applied to the air motor thereof is a relatively accurate indication of the braking force applied by that brake.

Figure 6:
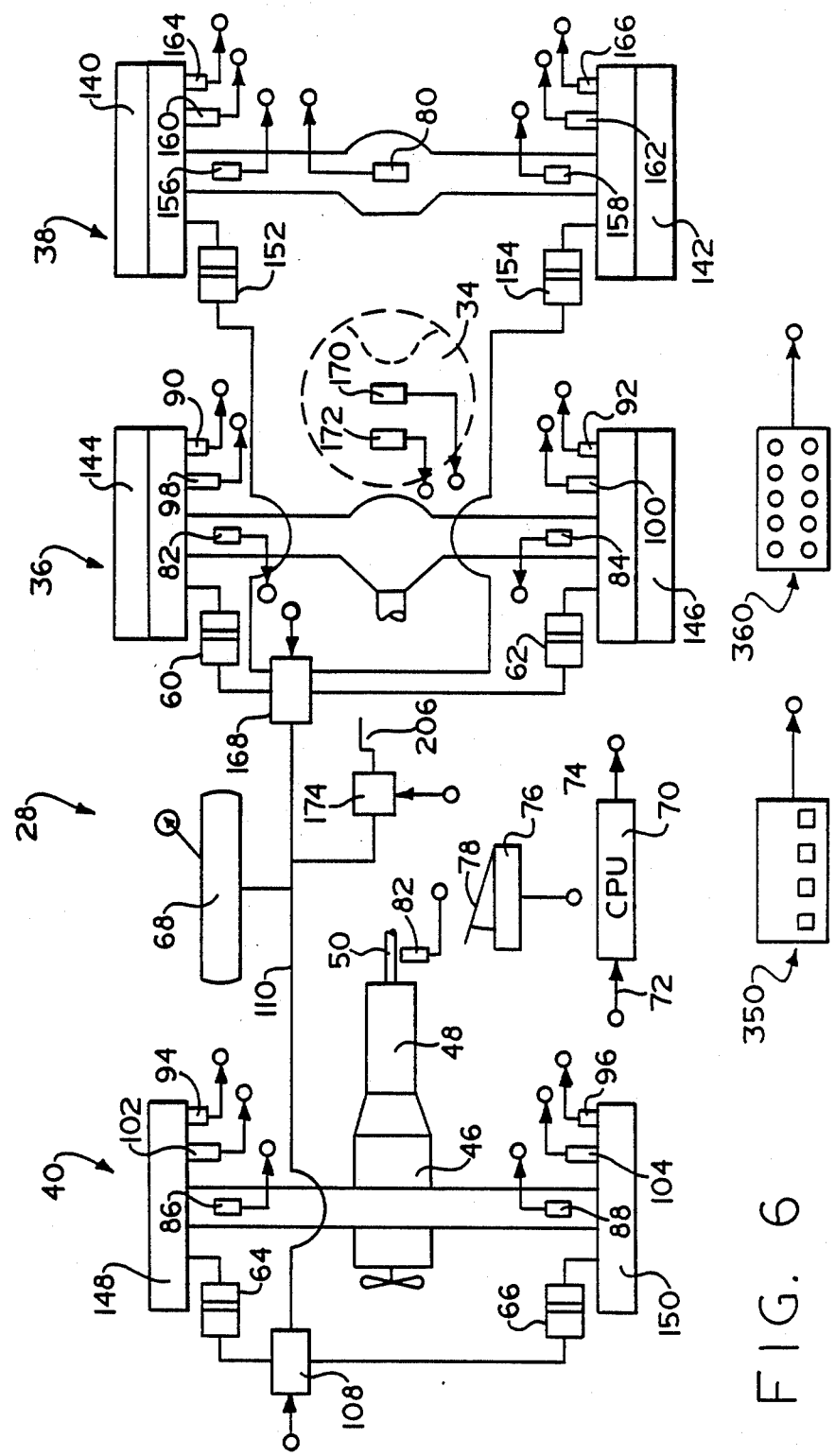
FIG. 6 is a schematic illustration of the brake system of the present invention for the multiple vehicle system of FIG. 3.

The braking system of the present invention is also applicable to multi-vehicle systems such as the tractor 28 and trailer 30 system 24 illustrated in FIG. 3. Referring to FIG. 6, the braking system for the tractor 28 of multi-vehicle system 24 may be seen. Briefly, as is well known in the prior art, tractor 28 includes a front steer axle 40, which is usually not driven, and a tandem pair of rear drive axles comprising front-rear drive axle 36 and rear-rear drive axle 38. Wheels 140 and 142 are associated with the rear-rear drive axle 38, wheels 144 and 146 are associated with the front-rear drive axle 36 and wheels 148 and 150 are associated with the front steer axle 40. As is typical with tractors, dual tires are utilized with each wheel of the rear drive axles. With the exception of requiring additional sets of rear brakes 152 and 154, load sensors 156 and 158, speed sensors 160 and 162, and temperature sensors 164 and 166, the brake system for tractor 28, as it relates to intra-tractor brake effort distribution is substantially identical in function and structure to the control system for truck 22 illustrated in FIG. 5. Accordingly, elements of the brake control system for tractor 28 which correspond with those utilized for truck 22 will be assigned like reference numerals and will not be described again in detail.

Rear control valve 168 is substantially identical to rear control valve 106 illustrated in FIG. 5 except that four individually controlled branch lines extend therefrom.

Briefly, air brakes 152 and 154 are substantially identical to air brakes 60 and 62. Force sensors 156 and 158 are preferably strain-guage based devices and are substantially structurally and functionally identical to force sensors 82 and 84. Wheel speed sensors 160 and 162 are substantially structurally and functionally identical to wheel speed sensors 98 and 100 while temperature sensors 164 and 166 are substantially structurally and functionally identical to temperature sensors 90 and 92.

With the exception that the brake system for tractor 28 includes six rather than four braked wheels (i.e. N=6 rather than N=4) as compared to the brake system for truck 22, the intra-tractor balanced, transitional and proportional braking modes are substantially identical to the same modes described above in connection with the braking system for truck 22. In a tractor-trailer vehicle system such as system 24 illustrated in FIG. 3, the inter-vehicle distribution of braking efforts is extremely important. Generally speaking, in order of magnitude of importance to achieve acceptable vehicle brake performance from both the minimized maintenance and maximized braking performance and stability goals, inter-tractor-trailer proportioned and balanced braking is at least as important as intra-tractor proportional and balanced braking and is considered to be more important than intra-trailer proportional and balanced braking. Accordingly, in a braking system for a tractor-trailer, it is important that means be provided to achieve inter-tractor-trailer braking effort distributions as discussed above. Further, it is also important to remember that tractors 28 are often owned by different individuals than those that own the trailers 30 and, even within a fleet with commonly owned tractors and trailers, a typical fleet will have many many more trailers than tractors.

Accordingly, it is highly desirable to provide a braking control system for a tractor-trailer vehicle system which requires little if any special equipment on the trailer and will provide relatively accurate tractor-trailer proportional braking and some degree of inter-tractor-trailer balanced braking.

To achieve a tractor-trailer braking system which will provide an acceptable degree of inter-tractor-trailer proportional and balanced braking, while requiring no additional equipment on the trailer, the tractor of the present invention is equipped with an accelerometer 80 for providing an input signal to CPU 70 indicative of the acceleration/deceleration of the vehicle and a pair of load sensors 170 and 172 for providing input signals to the CPU 70 indicative of the vertical and horizontal forces at the fifth wheel connection 34 between the tractor and trailer. In addition, a control valve 174, controlled by command outputs from CPU 70, will provide pilot or control signals to the standard trailer brake system control valves.

Figure 7:
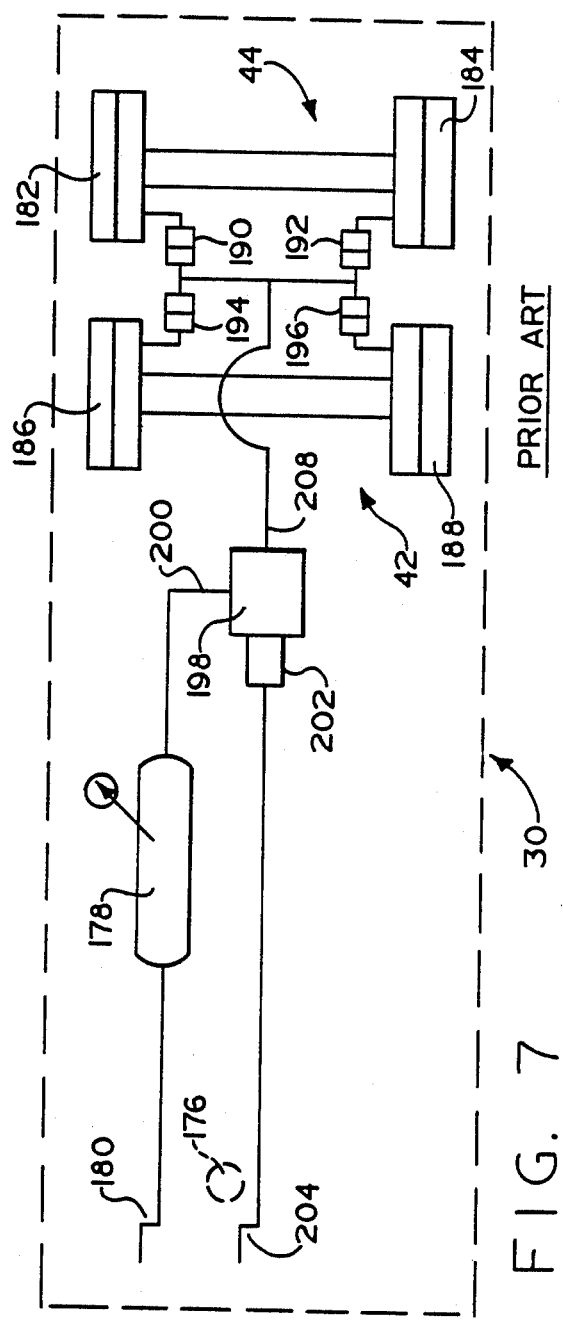
FIG. 7 is a schematic illustration of a standard trailer brake system which may be utilized with the brake system of FIG. 6.

Referring now to FIG. 7, a prior art standard trailer brake system is illustrated. Briefly, the trailer includes a king pin 176 for selective engagement and disengagement to the tractor fifth wheel 34 as is well known in the prior art. The trailer includes a supply tank 178 connected to the tractor air system by means of a fluid connection 180. Trailer axles 42 and 44 support trailer wheels 182, 184, 186 and 188, each of which is provided with an air brake 190, 192, 194 and 196, respectively. Typically, all of the trailer brakes are controlled at the same pressure by means of a relay valve 198, which has an inlet 200 connected to the trailer supply tank 178, and a pilot valve portion 202 for receiving a pilot air signal from the tractor air system by means of connector 204. Connector 204 is designed for connection with connector 206 on the tractor. Typically, the connectors 204 and 206 and likewise connector 180 and its associated connection with the vehicle air system (not shown) that form the fluid connection are known as the "glad hand".

As may be seen by reference to FIG. 7, the prior art standard trailer 30 has a brake system wherein each of the brakes is actuated at the same pressure from a single output 208 from the pilot controlled relay valve 198 and are thus all actuated at the same pressure which pressure is a function of the pressure to the pilot valve portion 202. Accordingly, as all of the brakes 190, 192, 194 and 196 are actuated at the same pressure and as individual control of the actuating pressures thereof is not available in a standard trailer, controlling the distribution of the braking effort between the trailer brakes to achieve intra-trailer balanced or proportional braking on a controlled basis is not possible. However, by utilizing the tractor braking system illustrated in FIG. 6, inter-tractor-trailer proportional and, to a degree, balanced braking, is obtainable.

Figure 10:
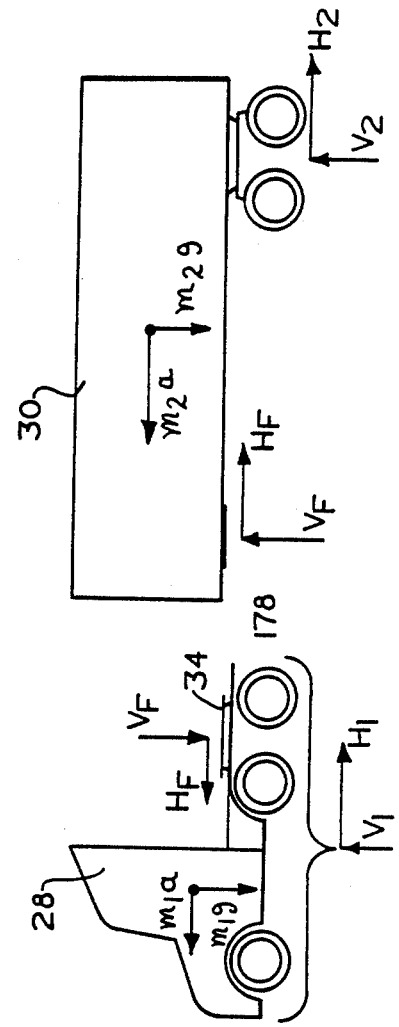
FIG. 10 is an equilibrium force diagram for the multiple vehicle system of FIG. 3.

As may be seen from the equilibrium force diagrams of FIG. 10, which do not include the aerodynamic, grade or transient forces:

$$H_1 = m_1 A + H_F$$

$$V_1 = M_1 g + V_F$$

$$H_2 = -M_2 a - H_F$$

$$V_2 = M_2 g - V_F$$

where
- $M_1$ = mass of tractor 20
- $M_2$ = mass of trailer 30
- $H_1$ = braking force of tractor 28;
- $H_2$ = braking force of trailer 30;
- $H_F$ = horizontal force at fifth wheel 34/ king pin 178;
- $V_1$ = weight supported by tractor axles;
- $V_2$ = weight supported by trailer axles;
- $V_F$ = weight on fifth wheel;
- g = gravity
- a = forward acceleration At tractor-trailer proportional braking conditions, the braking ratio of the tractor (taken as a unit) will be equal to the braking ratio of the trailer (taken as a unit), or;

$$H_1/V_{8n\ 1} = H_2/V_2$$

Additionally, the braking ratio of the interconnecting assembly ($H_F/V_F$) will equal the same value, i.e.:

$$H_F/V_F = H_2/V_2 = H_1/V_1$$

Given the above relationships, it may be seen that, if $H_F/V_F = -a$, then tractor-trailer proportional braking is achieved. Accordingly, by modulating the pressure applied to the tractor brakes (control of valves 108 and 168) and/or to the trailer brakes (control of valve 174), to minimize the error equation:

$$E = H_F - V_F * a,$$

tractor-trailer proportional braking, regardless of the load on the trailer, is provided and requires no additional sensors and/or control devices on the trailer. Aerodynamic, grade and transient forces are not ignored but are calculated from force sensor data.

Vehicle acceleration/deceleration can also be measured by use of the wheel speed sensors if proper allowance is made for slip. Of course, by using the vehicle acceleration/deceleration measurement device 80 in combination with the wheel speed sensors, a very accurate determination of wheel slip may be calculated.

Figure 11:
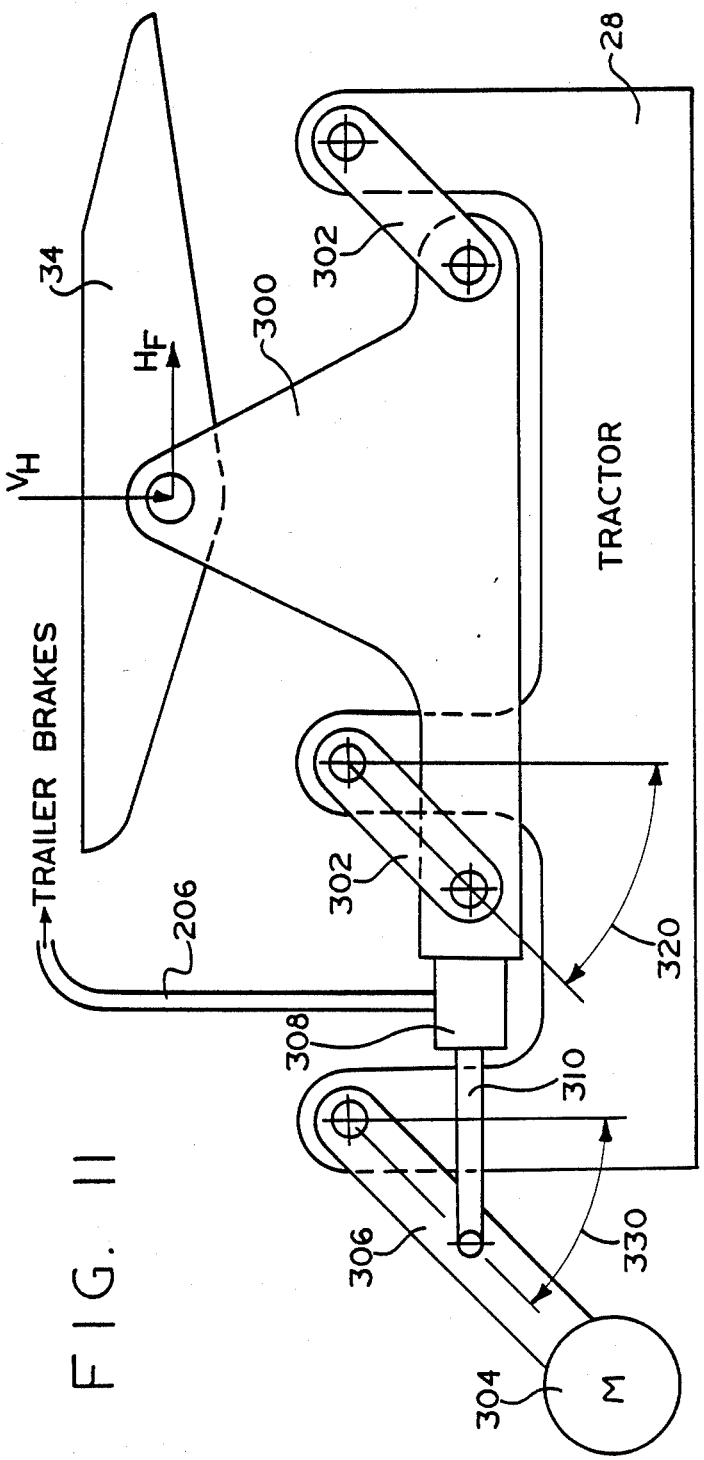
FIG. 11 is a schematic illustration of an alternate control device for the brake control system of the present invention.

An alternate, totally mechanical system, attached solely to the tractor 28, for maintaining tractor-trailer proportional braking by modulating air pressure to the trailer brakes to minimize the equation:

$$E = H_F/V_F * C + a,$$

is illustrated in FIG. 11.

The fifth wheel 34 is mounted to the tractor 28 by a fifth wheel carriage 300 pivotably supported by a pair of links 302. A mass 304 is pivotably mounted to the tractor 28 by a link 306. A valve 308 for controlling the supply of air to the trailer axle brakes is mounted to the fifth wheel carriage and is controlled by a horizontally extending valve plunger 310 fixed to link 306 for horizontal movement therewith. Valve 308 will replace the valve 174 illustrated in FIG. 6.

Links 302 define an angle 320 relative to vertical while link 306 defines an angle 330 relative to vertical. Briefly, the tangent of angle 330 is proportional to vehicle deceleration, a, while the tangent of angle 320 is proportional to the ratio $V_F/H_F$. Thus, if properly sized, at tractor-trailer proportional braking, (i.e. when $H_F/V_F = -a$), the tangent of angle 330 will equal the tangent of angle 320.

When the tractor brakes are applied with greater braking ratio than the trailer brakes, both the mass 304 and the fifth wheel carriage 300 will swing forward with angle 320 being greater than angle 330. This will cause valve plunger 310 to increasingly extend into the valve 308 to increase the pilot air pressure in line 206 to the trailer control valve pilot port 202. If the trailer brake ratio is greater than the tractor brake ratio, angle 330 will be greater than angle 320 and plunger 310 will decreasingly extend into control valve 308 to decrease the pilot pressure supplied to pilot air conduit 206.

To achieve tractor-trailer balanced braking, with a trailer of unknown braking configuration, certain assumptions are required as to the number and type of brakes with which the trailer brake system is equipped.

In a typical trailer brake system, all brakes are applied with the same pressure, thus knowing the number of trailer brakes (i.e. the number of brake equipped trailer axles) or is important to achieving an approximate tractor-trailer brake balance. By making certain calculations and/or assumptions as to trailer weight, and by knowing the pressure supplied to each brake (i.e. pilot pressure to valve 198) to achieve a known vehicle deceleration, the number of brakes (i.e. 2, 4, 6...) can be estimated with an acceptable accuracy.

In slightly more sophisticated systems, the trailer may be equipped with an identifier socket 348 to mate with identifier plug 360 on the tractor which will provide certain basic trailer brake system information to the CPU 70 such as number of brakes, types of brakes, types of actuators, etc. This same information may be inputed to the CPU 70 by means of an operator keyboard 350. With this information, a more accurate trailer/tractor balanced braking can be achieved.

Figure 8:
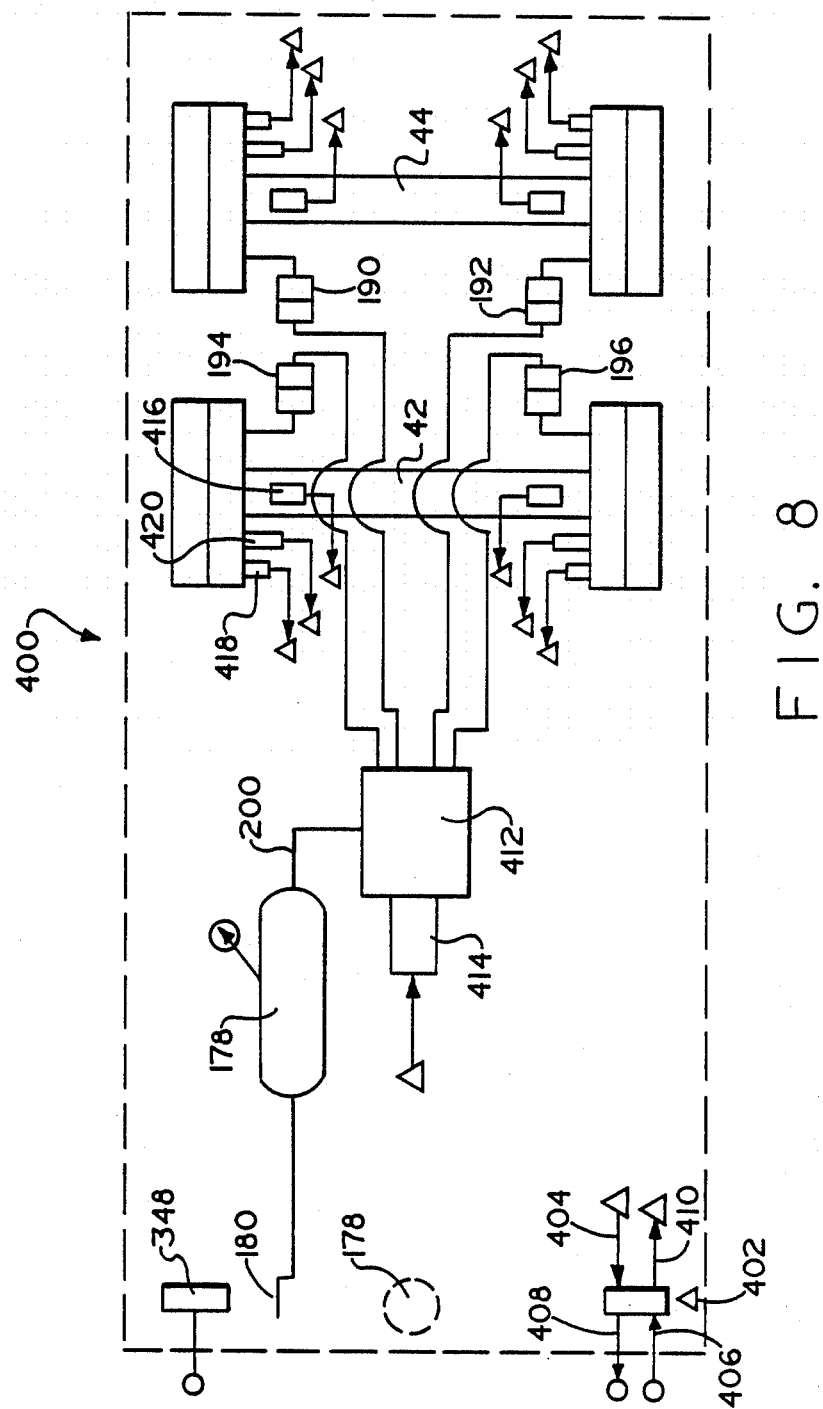
FIG. 8 is a schematic illustration of a trailer brake system specially equipped to interact with the tractor brake system illustrated in FIG. 6 to provide a more sophisticated multiple vehicle brake system.

A trailer brake system 400 including actuators and sensors specifically configured to interact with CPU 70 is illustrated in FIG. 8. A trailer logic unit (TLU) 402 is equipped with input devices 404 to receive input signals from trailer brake system sensors, input devices 406 to receive command output signals from CPU 70, output devices 408 to send the sensor input signals to CPU 70 and output devices 410 to transmit the command outputs from CPU 70 to the trailer brake system actuators. The TLU may also be equipped with RAM and/or ROM memory.

Each of trailer brakes 190, 192, 194 and 196 on each trailer axle 40, 42 is individually controllable by valve 412 which may be electronically controlled by an electronic control member such as solenoid pack 414. This will provide a relatively more rapid response valve and eliminate the need for the pilot pressure lines and connectors. Each of the brakes or axles may be provided with force sensors 416, temperature sensors 418 and/or wheel speed sensors 420.

Aside from allowing a much more accurate tractor-trailer balance braking, mode, the trailer brake system 400 will allow intra-trailer balanced braking and proportional braking to be achieved in the same manner as the intra-tractor braking described above.

Accordingly, a vehicle brake system and control method is provided that, depending upon the magnitude of the operator demand for braking effort, will distribute the braking effort between the vehicle brake equipped wheels in a balanced braking or proportional braking or intermediate braking mode. The vehicle brake system is suitable for intra-vehicle braking effort distributions and/or for inter-vehicle braking effort distributions.

A braking system for a multi-vehicle system, such as a tractor-trailer semi-truck 24 is provided that allows the inter-tractor-trailer braking effort to be distributed in a manner to achieve inter-tractor-trailer proportional braking while utilizing special sensors and control located solely on the tractor. The system will also allow a braking effort distribution to achieve an approximate of inter-tractor-trailer balanced braking.

While the preferred embodiments of the present invention have been described in connection with specific apparatus, the descriptions are made by way of example only and not as limitations on the spirit and scope of the invention as hereinafter claimed.

We claim:

1. A brake control system for a vehicle system euipped with multiple individually controllable brake sites, said system comprising sensing means to provide input signals indicative of (1) at least one of the braking force at each brake site and the load carried by each brake site and of the ratio of braking force to load carried at each brake site, and (2) of the level of braking effort demanded by the vehicle operator, a control unit having means for receiving said input signals and for processing said signals in accordance with predetermined logic rules to issue command output signals and actuators responsive to said command output signals for modulating a controlled parameter at each brake site related to the brake force at the brake site, said system characterized by:
  means for defining logic rules, said logic rules comprising:
  logic rules for comparing said demand input signal to a first reference value and to a second reference value equal to or greater than said first reference value, and
  if said demand signal is less than said first reference signal, logic rules for issuing command output signals for causing each of the brake sites to exert a brake force dependent upon the value of the demand input signal and independent of load, and
  if said demand signal is equal to or greater than said second reference value, logic rules for issuing commanded output signals for causing each of the brake sites to exert a brake force direclty related to the value of the demand input signal and to the load at the brake site.

2. The system of claim 1 wherein if said demand signal is equal to or greater than said second reference value, said command output signals cause the brake force at each of the brake sites to be applied to provide a predetermined braking ratio $$(H_X/V_X) \left[ \sum_{X=1}^{n} \right.$$

at each of the brake sites.

3. The system of claim 1 wherein if said demand signal is less than said first reference value, said command output signals cause the braking force at each brake site to be applied to substantially equalize the brake wear at each brake site.

4. The system of claim 2 wherein if said demand signal is less than said first reference value, said command ouptut signals cause the braking force at each brake site to be applied to substantially equalize the brake wear at each brake site.

5. The system of claim 4 wherein if said demand signal is less than the first reference value, said command output signals will cause the braking force at each brake of each braking site to be substantially equal to the magnitude of the demand signal multiplied by a constant related to the relative braking characteristic of the brake site.

6. The braking system of claim 4 wherein means are provided for providing an input signal indicative of temperature at each brake site and, if said demand signal is less than said first reference value, said control causes the brake force at each site to be modulated to achieve equal temperature at each brake site.

7. The braking system of claim 4 wherein means are provided for providing an input signal indicative of temperature at each brake site and, if said demand signal is less than said first reference value, said control causes the brake forces at each site to be modulated dependent upon said temperatures.

8. The brake control system of claim 7 wherein, if said demand signal is less than said first reference signal, said command output signals will cause the brake forces applied at each brake site, relative to brake forces applied at other brake sites, to be inversely proportional to the relative temperatures of the brake sites.

9. The control system of claim 4 wherein means are provided for providing an input signal indicative of the duration of application of each brake site and, if said demand signal is less than said first reference value, said command output signals will cause modulation of said control parameter to tend to equalize the value of the product of brake force multiplied by brake application time for each brake site.

10. The control of claim 1 wherein said demand signal is indicative of operator displacement of the vehicle brake pedal exrpessed as a percentage of full displacement, said first reference value corresponds to about 15% to 25% of full displacement and said second reference value corresponds to about 25% to 40% of full displacement.

11. The control of claim 2 wherein said demand signal is indicative of operator displacement of the vehicle brake pedal expressed as a percentage of full displacement, said first reference value corresponds to about 15% to 25% of full displacement and said second reference value corresponds to about 25% to 40% of full displacement.

12. The control of claim 4 wherein said demand signal is indicative of operator displacement of the vehicle brake pedal expressed as a percentage of full displacement, said first reference value corresponds to about 15% to 25% of full displacement and said second reference value corresponds to about 25% to 40% of full displacement.

13. The control of claim 1 wherein sensors are provided for sensing an existing or impending wheel lock condition at any vehicle brake and said control, regardless of the value of said demand input signal, will cause said brake forces to be modulated to terminate said sensed impending or existing wheel-lock condition.

14. The control of claim 2 wherein sensors are provided for sensing an existing or impending wheel lock condition at any vehicle brake and said control, regardless of the value of said demand input signal, will cause said brake forces to be modulated to terminate said sensed impending or existing wheel-lock condition.

15. The control of claim 4 wherein sensors are provided for sensing an existing or impending wheel lock condition at any vehicle brake and said control, regardless of the value of asid demand input signal, will cause said brake forces to be modulated to terminate said sensed impending or existing wheel-lock condition and will then modulate the brake forces dependent upon the value of the demand signal and to substantially equalize the braking ratio at each brake site.

16. The control system of claim 1 wherein said control unit is a microprocessor based electronic controller and said input signals are electronic signals.

17. The controller system of claim 4 wherein said control unit is a microprocessor based electronic controller and said input signals are electronic signals.

18. The brake control system of claim 4 wherein said vehicle system comprises a tractor portion and a trailer portion, said vehicle having a first brake site comprising the entire tractor brake system and a second brake site comprising the entire trailer brake system.

19. The brake control system of claim 4 wherein said vehicle is equipped with force sensors for sensing the braking and load force at each brake site.

20. The brake control system of claim 4 wherein said brakes are operated by pressurized fluid and said input signal indicative of brake force at said brake sites is a signal indicative of the pressure applied to the braking site.

21. A control method for a brake control system for controlling the distribution braking effort between the brake sites of a vehicle system equipped with multiple individually controllable brake sites, said system comprising sensing means to provide input signals indicative of (1) at least one of the braking force at each brake site and the load carried by each brake site and of the ratio of braking force to load carried at each brake site, and (2) of the level of braking effort demanded by the vehicle operator, a control unit having means receiving said input signals and for processing said signals in accordance with predetermined logic rules to issue command output signals and actuates responsive to said command output signals for modulating a controlled parameter at each brake site related to the brake force at the brake site, said control method characterized by:
   comparing said demand input signal to a first reference value and to a second reference value equal to or greater than said first reference value, and
   if said demand signal is less than said first reference signal causing said braking effort to be distributed between the brake sites to achieve balanced braking between said brake sites, and
   if said demand signal is equal to or greater than said second reference value, causing the braking effort to be distributed between the brake sites to achieve proportional braking between the brake sites.

22. A control method for a brake control system for a vehicle system equipped with multiple individually controllable brake sites, said system comprising sensing means to provide input signals indicative of (1) at least one of the braking force at each brake site and the load carried by each brake site and of the ratio of braking force to load carried at each brke site, and (2) of the level of braking effort demanded by the vehicle operator, a control unit having means for receiving said input signals and for processing said signals in accordance with predetermined logic rules to issue command output signals and actuators responsive to said command output signals for modulating a controlled parameter at each brake site related to the brake force at the brake site, said control method characterized by:
   comparing said demand input signal to a first reference value and to a second reference value equal to or greater than said first reference value, and
   if said demand signal is less than said first reference signal, causing each of the brake sites to exert a brake force dependent upon the value of the demand input signal and independent of load at the brake site, and
   if said demand signal is equal to or greater than said second reference value, causing each of the brake sites to exert a brake force directly related to the value of the demand input signal and to the load at the brake site.

23. The control method of claim 22 wherein if said demand signal is equal to or greater than said second reference value, causing the brake force at each of the brake sites to be applied to provide a predetermined braking ratio $$(H_X/V_X) \Big[_{X=1}^{n}$$

at each of the brake sites.

24. The control method of claim 22 wherein if said demand signal is less than said first reference value, causing the braking force at each brake site to be applied to substantially equalize the brake wear at each brake site.

25. The control method of claim 23 wherein if said demand signal is less than said first reference value, causing the braking force at each brake site to be applied to substantially equalize the brake wear at each brake site.

26. The control method of claim 25 wherein if said demand signal is less than the first reference value, the braking force at each brake of each braking site is substantially equal to the magnitude of the demand signal multiplied by a constant related to the relative braking characteristic of the brake site.

27. The control method of claim 25 wherein means are provided for providing an input signal indicative of brake friction material temperature at each brake site and, if said demand signal is less than each site to be modulated to achieve equal temperature at each brake site.

28. The control method of claim 25 wherein means are provided for providing an input signal indicative of the duration of application of each brake site and, if said demand signal is less than said first reference value, modulating said control parameter to tend to equalize the value of the product of brake force multiplied by brake application time for each brake site.

29. The control method of claim 22 wherein said demand signal is indicative of operator displacement of the vehicle brake pedal expressed as a percentage of full displacement, said first reference value corresponds to about 15% to 25% of full displacement and said second reference value corresponds to about 25% to 40% of full displacement.

30. The control method of claim 23 wherein said demand signal is indicative of operator displacement of the vehicle brake pedal expressed as a percentage of full displacement, said first reference value corresponds to about 15% to 25% of full displacement and said second reference value corresponds to about 25% to 40% of full displacement.

* * * * *